INVENTORS
JERRY BRAIMAN
EDWIN W. SHIEH
BY

*Robert Levine*

ATTORNEY

April 15, 1969    J. BRAIMAN ET AL    3,439,234
SELF-VENTING HOUSING FOR CAPACITORS
Filed Dec. 5, 1966

INVENTORS
JERRY BRAIMAN
EDWIN W. SHIEH
BY
ATTORNEY 3,439,234
SELF-VENTING HOUSING FOR CAPACITORS
Jerry Braiman and Edwin W. Shieh, Indianapolis, Ind.,
assignors to P. R. Mallory & Co., Inc., Indianapolis
Ind., a corporation of Delaware
Filed Dec. 5, 1966, Ser. No. 599,086
Int. Cl. H01g 9/12
U.S. Cl. 317—230    10 Claims

ABSTRACT OF THE DISCLOSURE

An electrolytic capacitor cartridge and a sleeve cooperate to define an unoccupied place. An open end of the sleeve is closed by a disc. The sleeve and the disc cooperate to define a recess which is filled with a mass of plastic material. The sleeve, the disc and the mass of plastic material provide a housing which is permeable to gases which may be evolved during operation of the capacitor.

---

The present invention relates to molded capacitors and more particularly to molded, wet electrolyte capacitors having self-venting characteristics.

Molded capacitors are known in the prior art and have been fabricated by a variety of methods using various thermoplastic and thermosetting materials. However, it was found that when the capacitor was encapsulated using pressure molding techniques, the capacitor cartridge was subjected to compressive pressures due to the molten thermoplastic material being injected into the mold under high pressures. The compressive pressure continued to be exerted by the plastic housing on the capacitor cartridge even after the molten plastic cooled. It was found that the molded capacitor of the prior art had no ostensible vent or valve for effectively releasing gases rapidly evolved whenever the capacitor was inadvertently subjected to a short circuit or overload condition. It should be noted that the short circuit and the overload conditions to which a capacitor may be subjected are abnormal operating conditions, not normal operating conditions. During operation of the capacitor under normal conditions, the capacitor may evolve gases such as hydrogen, ammonia, and oxygen as a natural result of the electrolytic action. In the normal operation situation, the prior art molded capacitors effectively and efficiently released the accumulated gases in a controlled manner. However, when the abnormal operating conditions existed, the compressive pressures exerted by the housing on the capacitor cartridge were of a sufficient magnitude as to prevent the controlled release of the gases accumulated rapidly within the capacitor housing. It was found that the compressive pressures exerted by the capacitor housing on the capacitor cartridge were of sufficient magnitude to substantially confine the rapidly evolved gases until excessive amounts of the gases accumulated therewithin. The subsequent release by the capacitor housing of the accumulated gases was not in a controlled manner but rather in an uncontrolled manner which was detrimental to other electrical or electronic components in close proximity with the capacitor.

There are several known methods for venting electrolytic capacitors enclosed or encased in metal housings. The typical type vent for an electrolytic capacitor enlosed in a metal housing includes an inlet member provided in the wall of the housing and suitable packing between this member and the wall such as for example, a rubber layer compressed between a flange of the member and the wall. The aforementioned type of vent functions well but is composed of several different components and materials. It is seen that vent or vents associated with metal housings for electrolytic capacitors have no applicability to the molded capacitor art due to the dissimilarity between the materials of the vent and of the materials normally used to provide a molded housing around hte capacitor cartridge. In order to achieve adequate sealing of the capacitor cartridge and adequate sealing around the terminal wires it is imperative that plastic materials having substantially the same fusion characteristics be used throughout the entire molded capacitor housing. The use of enistics permits the capacitor cartridges to be encapulsated and sealed conveniently and efficiently into a substantially and sealed conveniently and efficient into a substantially unitary body.

It was found that by placing the wet capacitor cartridge in a single open end plastic sleeve so that the terminals of the capacitor cartridge project therefrom and subsequently placing an apertured plastic disc having compatible fusion characteristics over the terminal wires thereby allowing the terminal wires to project therethrough in the open end of the sleeve thereby closing the sleeve and thereafter injecting a thermoplastic or thermosetting material having the same fusion characteristics as the disc and the sleeve adequately seals the terminal end of the capacitor housing yet does not subject the capacitor cartridge to compressive pressures. As a result thereof, whenever the capacitor is inadvertently operated under a short circuit or an overload condition so as to rapidly evolve gases, the gases are allowed to pass through the walls of the capacitor housing in a controlled manner thereby having no detrimental effect on surrounding electrical components due to the release of said gases.

In addition, it was found that the closed end of the single open end sleeve may be equipped with an integral conical shaped member projecting therefrom having a rounded tip or apex. The conical shaped member serves to predeterminately seat and anchor the capacitor cartridge in the sleeve in an improved manner thereby obviating the necessity for separate mounting means in the capacitor housing to seat and anchor the capacitor cartridge.

Accordingly, is is an object of the present invention to provide an economically encapsulated capacitor cartridge which overcomes each of the aforementioned problems in the molded capacitor art.

Another object of the present invention is to provide a molded capacitor having controlled self-venting characteristics. Yet another object of the present invention is to provide a molded capacitor having means by which rapid accumulations of gas with the capacitor housing may be released in a controlled manner and which, nevertheless, provides a completely liquid tight seal.

Another object of the present invention is to provide a capacitor having a molded housing including a predeterminately formed area therein which may be designated as a vent means through which rapidly accumulated gases are released in a controlled manner.

Yet still another object of the present invention is to provide a molded capacitor including a single open end sleeve having integrally formed therewith a conical-shaped projection adapted to predeterminately seat and locate a capacitor cartridge within the housing.

Another object of the present invention is to provide a means for locating and maintaining a capacitor cartridge within a single open ended sleeve without the use of ancillary means for seating the capacitor cartridge therewithin.

A further object of the present invention is to provide a molded capacitor having self-venting characteristics that is characterized by its simplicity of construction and by its economy of fabrication.

The present invention, in another of its aspects, relates to the novel features of the instrumentalities of the invention described therein and teaching the principal object of the invention and to the novel principles employed in the instrumentalities whether or not these features and principles may be used in the said object and/or in the said fields.

With the aforementioned objects enumerated, other objects will be apparent to those persons possessing ordinary skill in the art. Other objects appear in the following description, appended claims, and appended drawings. The invention resides in the novel construction, combination, arrangement and cooperation of elements as hereinafter described and more particularly as defined in the appended claims.

The appended drawings illustrate embodiments of the present invention constructed to function in the most advantageous modes devised for the practical application of the basic principles involved in the hereinafter described invention.

Figure 3:
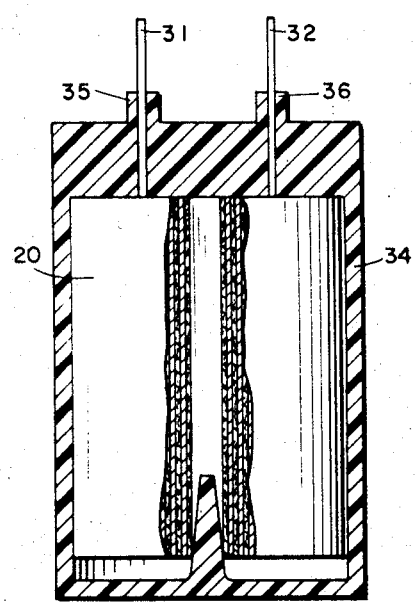

FIGURE 3 is a partial cross sectional view showing an integrally encapsulated capacitor after the recess formed by the apertured disc means and the walls of the sleeve have been filled with a plastic material having substantially the same fusion characteristics as the sleeve. In addition, FIGURE 3 illustrates that the capacitor cartridge is not subject to compressive pressures exerted thereon by the capacitor housing.

Figure 4:
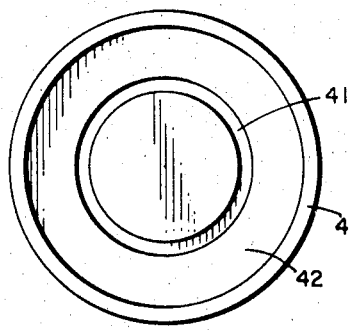

FIGURE 4 is a top view showing a circular recess formed in the closed end of the single open ended sleeve so as to provide means determinately located which will permit venting of gases rapidly accumulated within the capacitor housing when the capacitor is operated under abnormal conditions.

Figure 5:
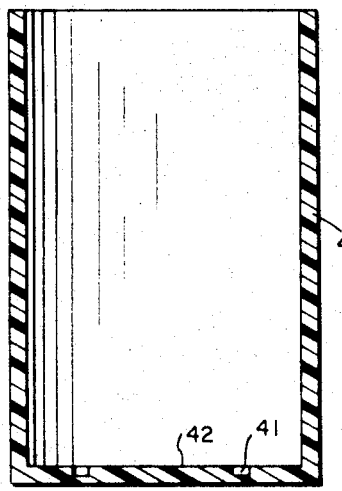

FIGURE 5 is a cross sectional view of the single open end sleeve illustrated in FIGURE 4.

Figure 6:
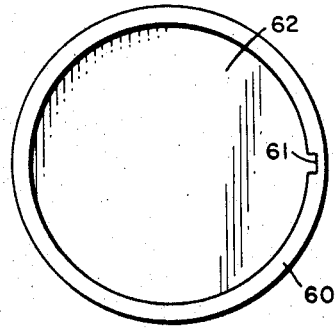

FIGURE 6 is a top view of a single open end sleeve having a longitudinally extending slot permitting controlled venting or exhausting of gases rapidly accumulated within the capacitor housing.

Figure 7:
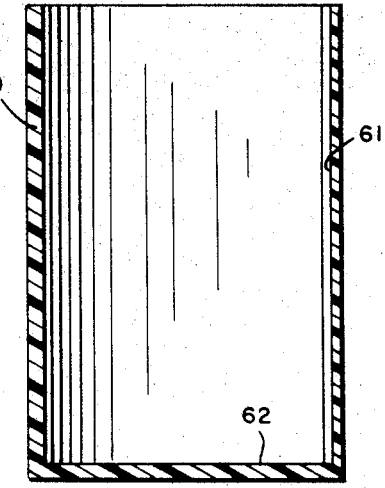

FIGURE 7 is a cross sectional side view of the single open end sleeve illustrated in FIGURE 6.

Figure 8:
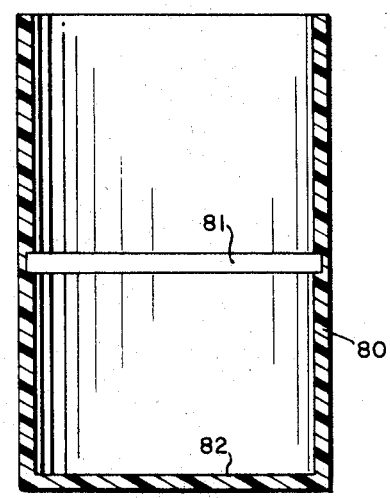

FIGURE 8 is a cross sectional view of a single open end sleeve having a circular ring recess formed in the side wall of the housing so as to permit controlled venting of rapidly accumulated gases at a determined area.

Generally speaking, the present invention relates to a means for retaining a capacitor cartridge comprising a molded, self-venting housing encapsulating the capacitor cartridge. Terminal ends close both extremities of the housing. Terminal wires are connected to the capacitor cartridge and project through one of the terminal ends closing the housing. The housing includes means for venting rapidly evolved gases accumulated therewithin when the capacitor is subjected to abnormal operation conditions. A convolutely wound wet electrolytic capacitor cartridge interfits with a sleeve which forms part of the housing. A portion of the sleeve extends beyond the capacitor cartridge and has the terminal wires projecting therethrough. Disc means fabricated from a plastic material having substantially the same fusion characteristics as the sleeve, interfits with the sleeve so as to define a recess. A mass of plastic material having substantially the same fusion characteristics as the disc and the sleeve fill the recess thereby forming a unitary plastic housing completely encapsulating a wet electrolytic capacitor cartridge. The encapsulated capacitor has self-venting characteristics and has terminal wires projecting therefrom.

The capacitor sleeve includes means integral therewith having substantially a conical shaped projection which is adapted to determinately seat and locate the capacitor cartridge within the housing.

Figure 1:
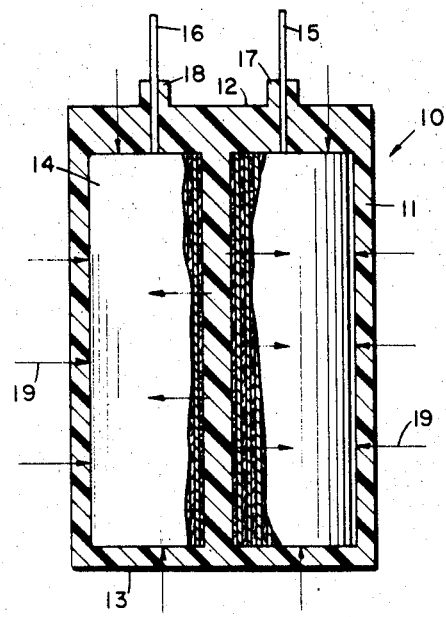
FIGURE 1 is a partial cross sectional view of a prior art molded capacitor illustrating the compressive pressures exerted on the capacitor cartridge by the capacitor housing.

Referring now to FIGURE 1 of the drawings, an encapsulated capacitor is generally indicated by the numeral 10. This is a capacitor having a unitary molded housing fabricated using prior art molding techniques. The capacitor is comprised of essentially housing 11, terminal end 12, terminal end 13, convolutely wound capacitor cartridge 14, terminal wires 15 and 16 and molded sealing tit formations 17 and 18 respectively circumscribing terminal wires 15 and 16 thereby forming an effective seal around the terminal wires. The capacitor housing 11 may be fabricated from any suitable thermoplastic material. Suitable thermoplastic material would be polypropylene, polyethylene, polyamide, polystyrene, polycarbonate and polyurethane resins. As stated hereinbefore, the encapsulated capacitor was fabricated using prior art pressure molding techniques to mold directly to the wet capacitor cartridge. When the capacitor was molded using prior art pressure molding techniques, it was found that the capacitor cartridge 14 was subjected to compressive pressure. It is thought the compressive pressures exerted by the housing on the capacitor cartridge are due to the molten thermoplastic or thermosetting material being injected into the mold under high pressure. The multiple arrows 19 shown in FIGURE 1 illustrate the compressive pressures acting on the cartridge so as to compress the capacitor cartridge. Although not immediately apparent, it was found that when the capacitor was subjected to an abnormal operating condition such as for example a short circuit or overload operating condition, gases were rapidly evolved and the normal permeability of the capacitor housing was not adequate to allow for the controlled release of the gases accumulated wtihin the housing. The gases accumulated in he housing to such a magnitude so as to be released in an uncontrolled manner which was detrimental to electronic components in close proximity to the capacitor.

Figure 2:
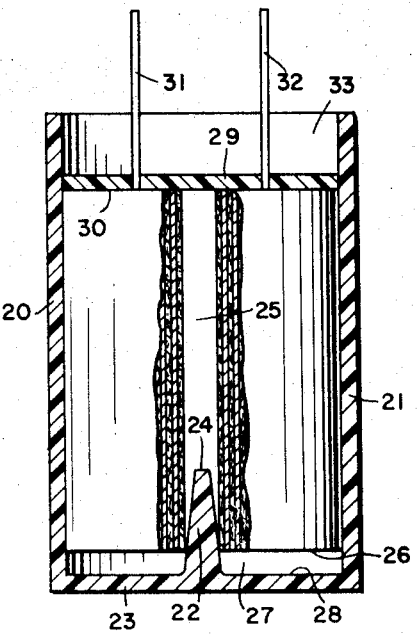
FIGURE 2 illustrates a single open ended sleeve having a conical projection used to seat the capacitor cartridge and an apertured disc means used to close the open end of the single open end sleeve.

FIGURES 2–8 of the drawings illustrate sleeve utilized in the fabrication of a molded capacitor having self-venting characteristics. Referring particularly to FIGURE 2, a capacitor cartridge 20 is shown interfitting with and seated in a single open end sleeve 21. The capacitor cartridge 20 may be a convolutely wound body having foil plates fabricated from any suitable film forming metal such as aluminum, tantalum and the like. The foil plates are separated by a suitable dielectric material such as porous paper or the like. The porous paper may be impregnated with any suitable electrolyte such as ethylene glycol-boric acid ammonia compounds or the like.

The single open end sleeve includes a conical projection 22 integral with the closed terminal end 23 or the single open end sleeve. The conical projection includes an apex 24 which is rounded or flat as is shown in FIGURE 2. The conical projection interfits with the axial aperture 25 of the convolutely wound capacitor cartridge 20 so as to seat and predeterminately locate a capacitor body within the single open ended sleeve 21. The embodiment of FIGURE 2 illustrates a void area 27 existing between the extremity 26 of the convolutely wound capacitor cartridge and the inner face 28 of the terminal end 23. The distance between extremity 26 of the capacitor cartridge and the inner face 28 of terminal end 23 may be conveniently varied by simply varying the radius and/or the length of the conical shaped projection 22. It is seen that if the radius and/or the length of the conical projection is made less, extremity 26 of the capacitor cartridge is allowed to move closer to the inner face 28 of the terminal end 23.

The open end of the single open end sleeve 21 is closed by disc means 29 which overlays the extremity 30 of the capacitor cartridge so as to intimately interfit with the inner periphery of the side walls of the single open ended sleeve. Apertures formed in the disc means permit terminal wires 31 and 32 to interfit with and project through the disc means so as to emerge from the single open end sleeve.

It is seen that the disc means and the single open end sleeve cooperate so as to form recess 33. The single open end sleeve and the disc means are fabricated from any suitable thermoplastic or thermosetting material which have substantially the same fusion characteristics.

FIGURE 3 shows the capacitor cartridge 20 illustrated in FIGURE 2 completely encapsulated within capacitor housing 34. A mass of thermoplastic material or a mass of thermosetting material having substantially the same fusion characteristics as the disc 29 and the single open end sleeve 21 is injected into recess 33 so as to fill said recess and cause the disc, the sleeve and the mass of injected material to become a unitary housing encapsulating the capacitor. Tit formations 35 and 36 are respectively formed circumscribing terminal wires 31 and 32. The tit formations circumscribing the terminal wires effectively seal the terminal wires so that no special plugging provisions are necessary for insuring tightness of the end seal circumscribing the terminal wires as the end closure material effects a secure mechanical bond thereto.

As is noted in FIGURE 3, no compressive forces or pressures are exerted against the capacitor cartridge by the housing, and as a result thereof, the capacitor cartridge is not confined under pressure. Therefore, when, if ever, the capacitor is subjected to an abnormal operating condition so as to rapidly evolve gases, the gases are allowed to escape through the capacitor housing in a controlled manner which is not detrimental to electronic components in close proximity to the capacitor.

FIGURES 4 to 8 illustrate single open end sleeves having integral notches or recesses formed therein which control the area in the housing of egress of the rapidly evolved gases from the capacitor housing.

FIGURE 4 shows a single open end sleeve 40 having a circular-shaped recess 41 formed in the terminal end 42 of the sleeve. It should be noted that the circular recess 41 is formed on the inner face of the terminal end 42. The circular shaped recess provides an area in the finished housing for controlled release of rapidly evolved gases.

FIGURE 5 is a cross sectional view of the single open end sleeve 40 illustrated in FIGURE 4. The relative depth of the circular recess 41 is more clearly illustrated in FIGURE 5. As pointed out hereinbefore the circular recess 41 provides a predeterminately located control area for the release of rapidly evolved gases due to the capacitor being subjected to an abnormal condition.

FIGURE 6 shows a single open end sleeve 60 including a longitudinal slot 61 extending the length thereof and a terminal end 62. The longitudinal slot 61 provides an area in the finished housing through which rapidly evolved gases may emerge.

FIGURE 7 is a cross sectional view of the single open end sleeve 60 illustrated in FIGURE 6. The relative depth and the length of the longitudinal slot 60 are illustrated in FIGURE 7.

FIGURE 8 illustrates a single open end sleeve 80 having a terminal end 82 and a circular recess formed in the inner periphery of the side wall of the sleeve 80. As disclosed hereinbefore, the circular recess provides an area for the controlled release of rapidly evolved gases accumulated within the capacitor housing when the capacitor is subjected to abnormal conditions.

While the invention is illustrated and described in embodiments, it will be understood that modifications and variations may be effected without departing from the scope of the novel concepts of this invention as set forth in the appended claims.

Having thus described the invention, we claim:

1. A self-venting housing and an electrolytic capacitor cartridge therein having terminals means projecting therefrom comprising a sleeve of plastic material having an open end, said sleeve being permeable to evolved gases therein, an electrolytic capacitor cartridge inter-fitting with the sleeve, said capacitor cartridge and said sleeve cooperating to define an unoccupied space therein, a portion of said sleeve extending beyond said capacitor cartridge and having terminal means projecting therethrough, disc means, of substantially the same permeable material as said sleeve, in the open end of said sleeve and closing said open end of said sleeve, said disc and said sleeve defining a recess, a mass of plastic of substantially the same permeable material as the disc and the sleeve substantially filling the recess thereby forming a housing encapsulating said electrolytic capacitor cartridge having self-venting characteristics and having said terminal means projecting therefrom.

2. A self-venting housing and an electrolytic capacitor cartridge therein as claimed in claim 1, wherein said sleeve includes a closed end and wherein at least a portion of said unoccupied space defined by said capacitor cartridge and said sleeve is a recess formed in said closed end of said sleeve.

3. A self-venting housing and an electrolytic capacitor cartridge therein as claimed in claim 1, wherein at least a portion of said unoccupied space defined by said capacitor cartridge and said sleeve is a recess formed in the inner wall of said sleeve.

4. A self-venting housing and an electrolytic capacitor cartridge therein as claimed in claim 1, wherein said plastic material and said disc means and said plastic mass is a thermoplastic material selected from the group consisting of polypropylene, polyethylene, polyamide, polystyrene, polycarbonate and polyurethane resins or a thermosetting material.

5. A self-venting housing and an electrolytic capacitor cartridge therein as claimed in claim 1, wherein said mass of plastic includes tit formations substantially circumscribing said terminal means whereby a seal is provided for said terminal means.

6. A self-venting housing and an electrolytic capacitor cartridge therein as claimed in claim 1, wherein said sleeve includes means for locating said capacitor cartridge within said sleeve.

7. A self-venting housing and an electrolytic capacitor cartridge therein as claimed in claim 6, wherein said sleeve includes a closed end and wherein said means for locating said capacitor cartridge within said sleeve is co-operatively associated with said closed end of said sleeve.

8. A self-venting housing and an electrolytic capacitor cartridge therein as claimed in claim 7, wherein said capacitor cartridge includes a recess and wherein said means for locating said capacitor cartridge within said sleeve is a projection integral with said closed end of said sleeve, said projection inter-fitting with said recess of said capacitor cartridge whereby said capacitor cartridge is located within said sleeve.

9. A self-venting housing and an electrolytic capacitor cartridge therein as claimed in claim 8, wherein said projection and said recess of said capacitor cartridge cooperate whereby said capacitor cartridge is spaced from said closed end of said sleeve thereby defining at least a portion of said unoccupied space.

10. A self-venting housing and an electrolytic capacitor cartridge therein as claimed in claim 9, wherein said projection is substantially conical-shaped.

References Cited

UNITED STATES PATENTS

| 2,758,259 | 8/1956 | Peck | 317—230 |
| 2,806,982 | 9/1957 | Halik et al. | 317—230 |
| 2,856,570 | 10/1958 | Peck | 317—230 |
| 3,214,649 | 10/1965 | Clargo et al. | 317—230 |
| 3,277,350 | 10/1966 | Pearce et al. | 317—230 |
| 3,300,692 | 1/1967 | Boae | 317—230 |

JAMES D. KALLAM, *Primary Examiner.*

U.S. Cl. X.R.

317—260